United States Patent
Yu et al.

(10) Patent No.: US 6,944,028 B1
(45) Date of Patent: Sep. 13, 2005

(54) STORAGE MEMORY DEVICE

(75) Inventors: Gordon Yu, Hsin Chu (TW); Tony Chang, Miao-Li Hsien (TW); Forli Wen, Hsinchu (TW)

(73) Assignee: C-One Technology Corporation, Hsinchu (TW)

( * ) Notice: Subject to any disclaimer, the term of this patent is extended or adjusted under 35 U.S.C. 154(b) by 0 days.

(21) Appl. No.: 10/872,936

(22) Filed: Jun. 19, 2004

(51) Int. Cl.$^7$ ............................ H05K 7/10; H05K 7/12; H01R 25/00
(52) U.S. Cl. ...................... 361/737; 361/740; 361/801; 361/747; 361/759; 361/726; 235/492; 439/654; 439/357; 439/328
(58) Field of Search ............................... 361/737, 726, 361/728, 730, 732, 740, 747, 752, 759, 801; 235/492; 439/620, 638, 654, 357, 328

(56) References Cited

U.S. PATENT DOCUMENTS

| | | | |
|---|---|---|---|
| 6,234,845 B1 * | 5/2001 | Hakozaki .................... 439/633 |
| 6,462,273 B1 * | 10/2002 | Corisis et al. ............. 174/52.2 |
| 6,567,273 B1 * | 5/2003 | Liu et al. .................... 361/737 |
| 6,744,634 B2 * | 6/2004 | Yen ............................. 361/752 |
| 6,776,348 B2 * | 8/2004 | Liu et al. .................... 235/492 |
| 6,813,134 B2 * | 11/2004 | Tatsumi et al. ............. 361/234 |
| 6,877,994 B2 * | 4/2005 | Huang ....................... 623/1.15 |
| 2004/0033725 A1 * | 2/2004 | Schmieding et al. ....... 439/654 |

* cited by examiner

Primary Examiner—Kamand Cuneo
Assistant Examiner—Dameon E. Levi

(57) ABSTRACT

A storage memory device includes a primary body comprised of a first memory card at one side and a connection portion at the other side. Contacts are provided in the connection portion and in electrical connection with the first memory card to serve as a data transmission interface for the first memory card. The storage memory device further includes a secondary body forming a first slot for receiving the connection portion therein. The secondary body may include a second memory card electrically connectable to the first memory card via the contacts of the connection portion. Alternatively, the second memory card of the secondary body is omitted and replaced by a second slot into which another primary body comprised of a connection portion having contacts and a memory card is received. Thus, electrical connection and data exchange between the two memory cards, either between the first and second memory cards or between the two first memory cards, can be done easily with the contacts of the connection portions.

5 Claims, 6 Drawing Sheets

STORAGE MEMORY DEVICE

BACKGROUND OF THE INVENTION

1. Field of the Invention

The present invention relates generally to an electronic memory device, for example a memory card, such as Multi-Media Card, Smart Media Card, Memory Stick, Security Digital Card, and in particular to a storage memory device comprising contacts for selective connection with another memory device so as to allow for mutual access of data stored in both memory devices.

2. The Related Art

A variety of memory cards are available commercially for storage of data. These memory cards have different specifications, which require different card reading devices to access data stored in the memory cards. Further, the commercially available memory cards are also of such designs that are not compatible with electrical connectors, such as USB connectors, that are provided in electronic appliance, such as a computer, for data exchange and access. Data exchange between different memory cards is also not permitted by the designs of the commercial memory cards.

Thus, it is desired to have a storage memory device that overcomes the above problems.

SUMMARY OF THE INVENTION

Therefore, a primary object of the present invention is to provide a storage memory device that allows for mating engagement between a memory card and an electrical connector of specification different from that of the memory card.

Another object of the present invention is to provide a storage memory device that allows for interconnection between two memory cards for data exchange therebetween.

A further object of the present invention is to provide a storage memory device comprising a contact cap for protection of contacts of the storage memory device.

To achieve the above objects, in accordance with the present invention, there is provided a storage memory device comprising a primary body comprised of a first memory card at one side and a connection portion at the other side. Contacts are provided in the connection portion and in electrical connection with the first memory card to serve as a data transmission interface for the first memory card. The storage memory device further includes a secondary body forming a first slot for receiving the connection portion therein. The secondary body may include a second memory card electrically connectable to the first memory card via the contacts of the connection portion. Alternatively, the second memory card of the secondary body is omitted and replaced by a second slot into which another primary body comprised of a connection portion having contacts and a memory card is received. Thus, electrical connection and data exchange between the two memory cards, either between the first and second memory cards or between the two first memory cards, can be done easily with the contacts of the connection portions.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
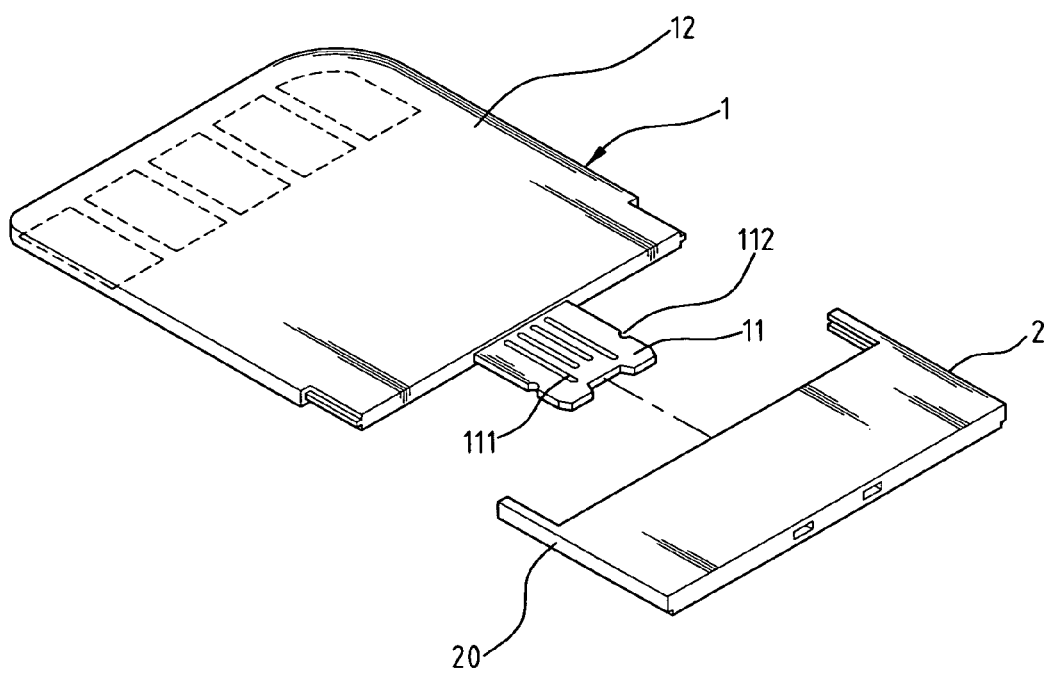
FIG. 1 is an exploded view of a storage memory device constructed in accordance with the present invention.
Figure 2:
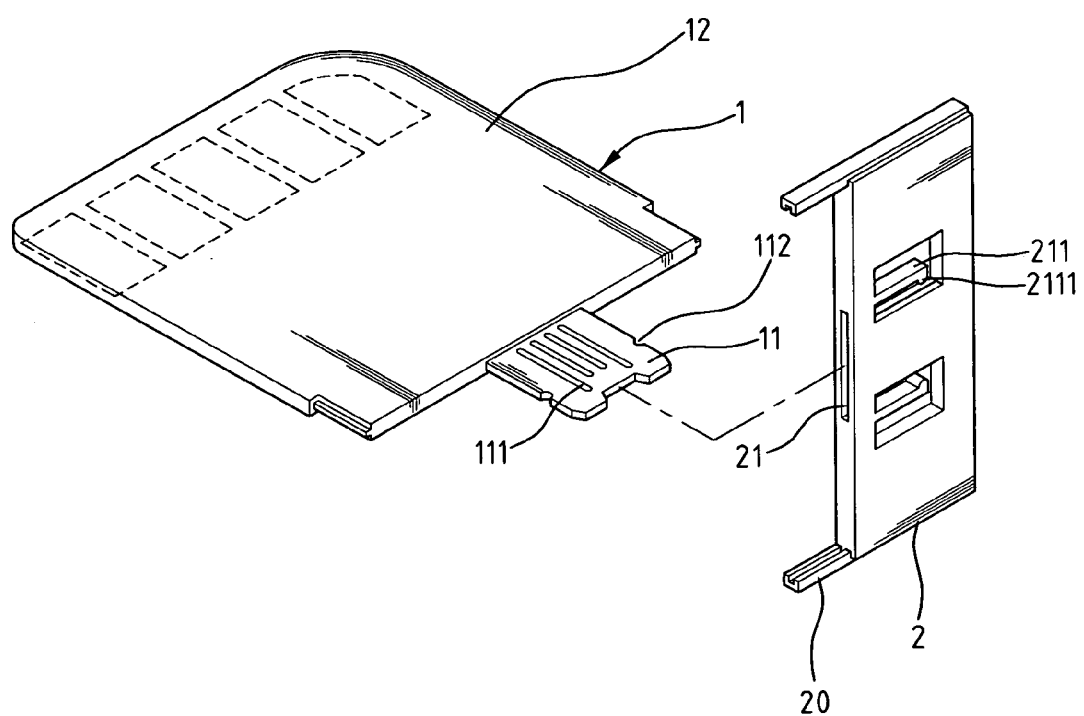
FIG. 2 is also an exploded view of the storage memory device with a secondary body of the device viewed from different perspective.
Figure 3:
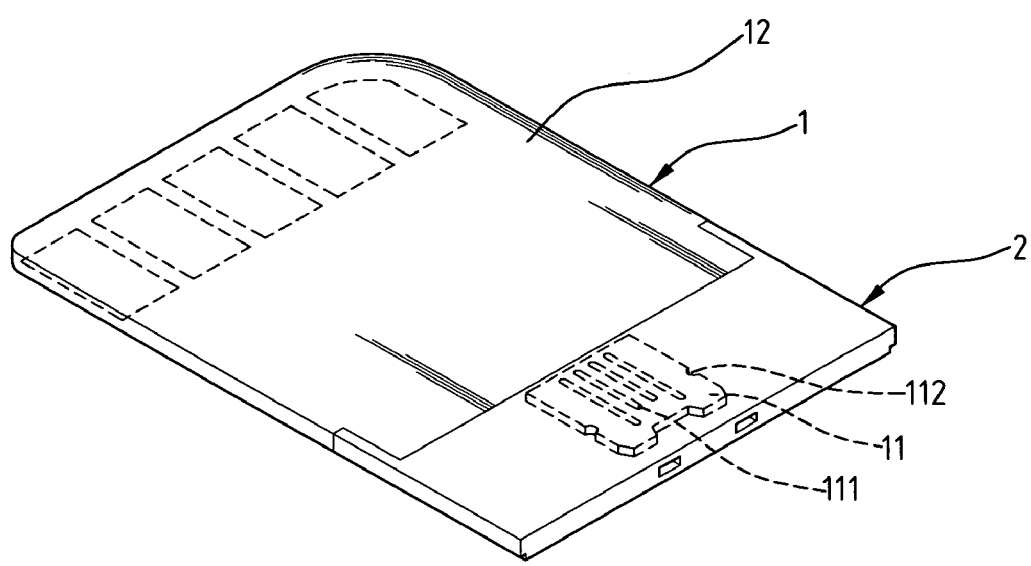
FIG. 3 is an assembled view of FIG. 1.

With reference to the drawings and in particular to FIGS. 1–3, a storage memory device constructed in accordance with the present invention comprises a primary body 1 and a secondary board 2 releasably engageable with each other to form a unitary device. The primary body 1 is comprised of an electronic memory card 12, which is capable of storage of data in electronic form, on one side and a connection portion 11 on the other side. In the embodiment illustrated, the connection portion 11 takes a configuration of a projecting tongue having opposite surfaces on at least one of which are provided conductive contacts 111 that are in electrical connection with the memory card 12 and may thus serve as a data transmission interface for the memory card 12.

The connection portion 11 and the contacts 111 are structured and configured to be mechanically and electrically compatible with a regular electrical connector commonly available on an electrical appliance, such as a USB (Universal Serial Bus) connector on a personal computer (both not shown). Thus, the connection portion 11 is mateable with the regular electrical connector for establishing electrical connection between the electrical appliance and the memory card 12 of the storage memory device of the present invention.

The secondary body 2 is releasably fit over the connection portion side of the primary body 1 for covering the connection portion 11 and protecting the contacts 111. In the embodiment illustrated, the secondary body 2 comprises two side arms 20 fit over opposite edges of the primary body 1 for guiding the engagement between the primary and second bodies 1, 2. The secondary body 2 also defines a slot 21 configured complementary in size and shape to the connection portion 11 whereby the connection portion 11 is completely receivable in the slot 21 and thus protected thereby.

Coupling means is provided to secure the connection portion 11 in the secondary body 2, comprising a pair of spaced snap-on arms 211 formed in the secondary body 2 on opposite sides of the slot 21 and notches 112 defined in opposite edges of the connection portion 11. The arms 211 are made resilient and each forms a barb 2111 in proximity of a free end thereof. When the connection portion 11 is inserted into the slot 21, the arms 211 are elastically deformed to facilitate the engagement between the barbs 2111 and the notches 112, as illustrated in FIG. 3, which the connection portion 11 in the slot 21.

Figure 4A:
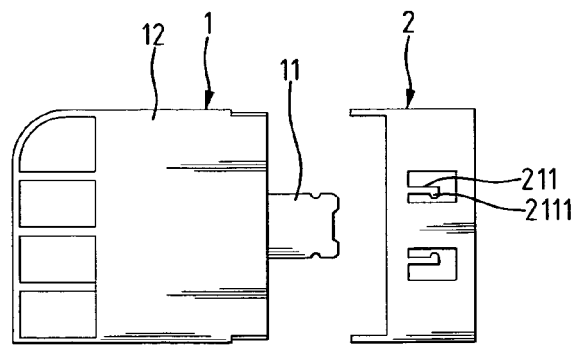
FIGS. 4A–4C illustrate engagement between primary and secondary bodies of the storage memory device of the present invention.
Figure 4B:
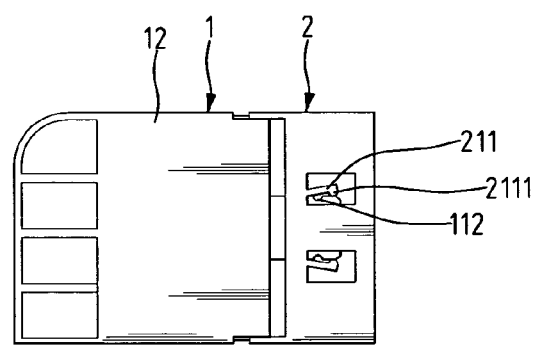
Figure 4C:
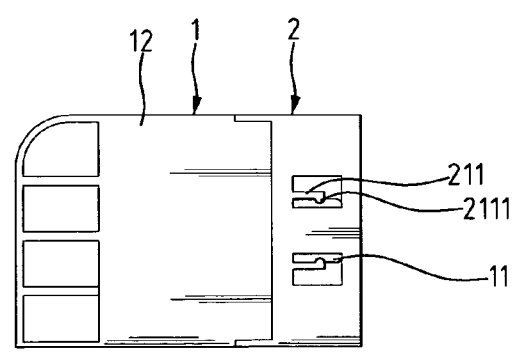

The engagement of the secondary body 2 with the primary body 1 is sequentially illustrated in a stepwise manner in FIGS. 4A, 4B, and 4C. The primary and secondary bodies 1, 2 are positioned to have the connection portion 11 of the primary body 1 substantially in alignment with the slot 21 of the secondary body 2, see FIG. 4A. The primary and secondary bodies 1, 2 are moved toward each to have the connection portion 11 inserted into the slot 21 under the guide of the side arms 20 of the secondary 2 and the edges of the primary body 1, see FIG. 4B. Once the connection portion 11 is completely fit into the slot 21, the barbs 2111 of the snap-on arms 211 get into engagement with the notches 112 of the connection portion 11 thereby securing the primary and secondary bodies 1, 2 together, see FIG. 4C.

Figure 5:
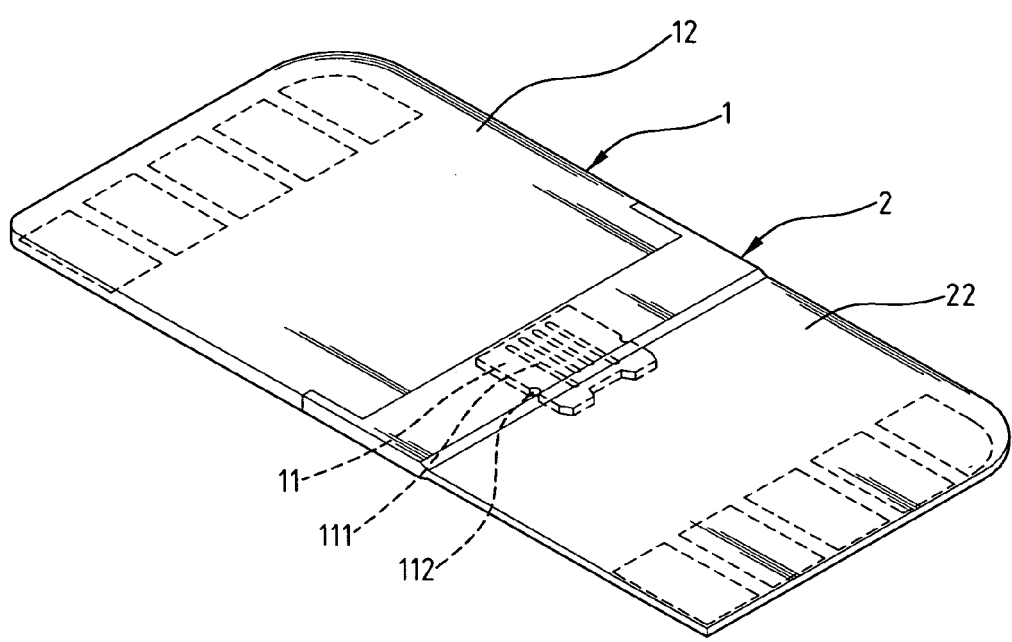
FIG. 5 is a perspective view of a storage memory device constructed in accordance with another embodiment of the present invention.

FIG. 5 shows another embodiment of the storage memory device in accordance with the present invention, wherein the secondary body 2 comprises a secondary memory card 22 integrated therewith. The secondary memory card 22 is substantially opposite to the slot 21 that receives the connection portion 11 of the primary body 1. Thus, in the embodiment, both the primary and second bodies 1, 2 comprise a memory card 12, 22. Contacts (not shown) are provided in the slot 21 for engagement with the contacts 111 of the connection portion 11 whereby when the connection portion 11 of the primary body 1 is inserted into the slot 21 of the secondary body 2, with the contacts thereof engaging each other, the memory cards 12, 22 are electrically connected to each other and data exchange may be performed under the control of a control circuit (not shown) provided therein.

Figure 6:
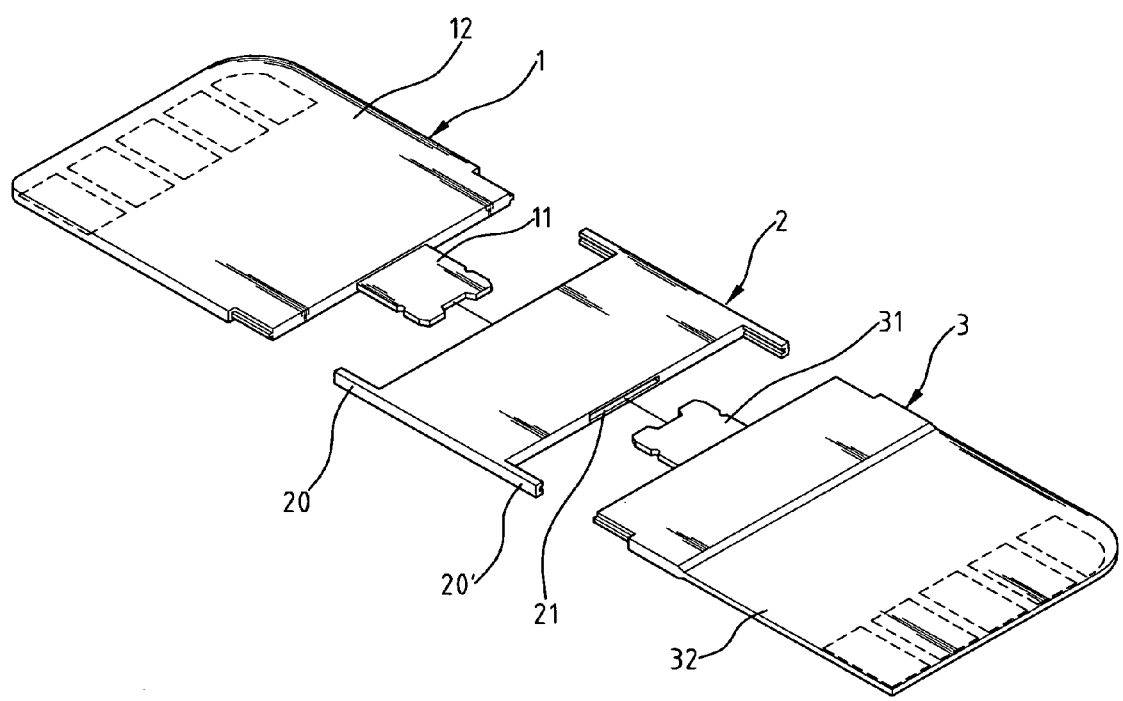
FIG. 6 is an exploded view of a storage memory device constructed in accordance with a further embodiment of the present invention.

FIG. 6 shows a further embodiment of the storage memory device in accordance with the present invention, wherein the secondary body 2 comprises two pairs of side arms 20, 20' extending in opposite directions for respectively fitting over two primary bodies 1, 3. The secondary body 2 also has two opposite edges respectively associated with the side arms 20, 20'. A slot 21 is defined in each edge of the secondary body 2 for matingly receiving a connection portion 11, 31 of the primary body 1, 3, respectively. Thus, the connection portions 11, 31 of the two primary bodies 1, 3 can be protected by the secondary body 2, while electrical connection is allowed to establish between the two primary bodies 1, 3 thereby data stored in memory cards 12, 32 associated with the primary bodies 1, 3 can be exchanged with each other.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A storage memory device comprising:
a primary body including a first memory card at one side and an extended connection portion at the other side, said extended connection portion having two sides each being formed with a notch; and
a secondary body having a first slot for receiving said extended connection portion, and a pair of snap-on arms formed on two sides of said first slot, each snap-on arm having a barb for engaging with said notch;
wherein at least one contact in electrical connection with said first memory card is formed on said extended connection portion for forming a transmission interface for said first memory card.

2. The storage memory device as claimed in claim 1, wherein said primary body further has two recessed edges and said secondary body has two extended side arms for coupling with said two recessed edges.

3. The storage memory device as claimed in claim 1, wherein said extended connection portion is configured to be compatible with USB connection.

4. The storage memory device as claimed in claim 1, wherein said secondary body further comprises a second memory card that is electrically connectable to said first memory card by means of said at least one contact of said extended connection portion.

5. The storage memory device as claimed in claim 1, wherein said secondary body further comprises a second slot formed on an opposite side of said first slot, and a pair of snap-on arms formed on two sides of said second slot, said second slot having a configuration substantially identical to said first slot for receiving a memory body having a configuration substantially identical to said primary body.

* * * * *